United States Patent [19]
Blech et al.

[11] Patent Number: 5,134,303
[45] Date of Patent: Jul. 28, 1992

[54] LASER APPARATUS AND METHOD FOR MEASURING STRESS IN A THIN FILM USING MULTIPLE WAVELENGTHS

[75] Inventors: Ilan A. Blech, Sunnyvale; Dov E. Hirsch, Cupertino, both of Calif.

[73] Assignee: Flexus, Inc., Sunnyvale, Calif.

[21] Appl. No.: 567,981

[22] Filed: Aug. 14, 1990

[51] Int. Cl.$^5$ .................. G01N 21/86; G01B 11/30
[52] U.S. Cl. .................. 250/560; 356/371; 250/226
[58] Field of Search .......... 356/32, 381, 382, 371–376; 250/560, 571, 226

[56] References Cited

U.S. PATENT DOCUMENTS

| | | | |
|---|---|---|---|
| 3,857,637 | 12/1974 | Obenreder | 356/371 |
| 4,865,445 | 9/1989 | Kuriyama et al. | 356/382 |
| 4,900,940 | 2/1990 | Nakamura | 250/560 |

FOREIGN PATENT DOCUMENTS

| | | | |
|---|---|---|---|
| 0251610 | 11/1987 | Fed. Rep. of Germany | 356/371 |
| 0261832 | 11/1988 | Fed. Rep. of Germany | 356/382 |
| 0125865 | 11/1978 | Japan | 356/371 |
| 0055704 | 4/1983 | Japan | 356/381 |
| 0060203 | 4/1984 | Japan | 356/381 |
| 0237005 | 10/1986 | Japan | 356/371 |
| 0277508 | 12/1987 | Japan | 356/371 |
| 0212807 | 9/1988 | Japan | 356/382 |
| 0051009 | 2/1990 | Japan | 356/371 |
| 2078944 | 1/1982 | United Kingdom | 356/371 |

OTHER PUBLICATIONS

A. Segmuller et al., "Automatic x-ray diffraction measurement of the lattice curvature of substrate wafers for the determination of linear strain patterns," J. Appl. Physics. 51(12), pp. 6225–6230, Dec. 1980.

A. K. Sinha et al., "Thermal stresses and cracking resistance of dielectric films (SiN, $Si_3N_4$, and $SiO_2$) on Si substrates," J. Appl. Phys. 49(4), pp. 2423–2426, Apr. 1978.

P. Flinn, "Principles and Applications of Wafer Curvature Techniques for Stress Measurements in Thin Films," Thin Films: Stresses and Mechanical Properties MRS Proceedings, vol. 130, ed. Bravman, Nix, Barnett, Smith, pp. 41–51, 1989.

E. Kobeda et al., "In situ stress measurements during thermal oxidation of silicon," J. Vac. Schl. Technol. B 7(2), pp. 163–166, Mar./Apr. 1989.

J. T. Pan et al., "In situ stress measurement of refractory metal silicides during sintering," J. Appl. Phys. 55(8), pp. 2874–2880, Apr. 15, 1984.

*Primary Examiner*—David C. Nelms
*Assistant Examiner*—Michael Messinger
*Attorney, Agent, or Firm*—Skjerven, Morrill, MacPherson, Franklin & Friel

[57] ABSTRACT

In accordance with the present invention, an apparatus and a method for measuring the radius of curvature of a surface using laser beams of multiple wavelengths are provided. The present invention avoids poor measurement due to destructive interference of the beams reflected at a thin film's upper and lower surfaces. The present invention is applicable to laser reflection stress measurement apparatuses of both scanning and beam-splitting types.

8 Claims, 7 Drawing Sheets

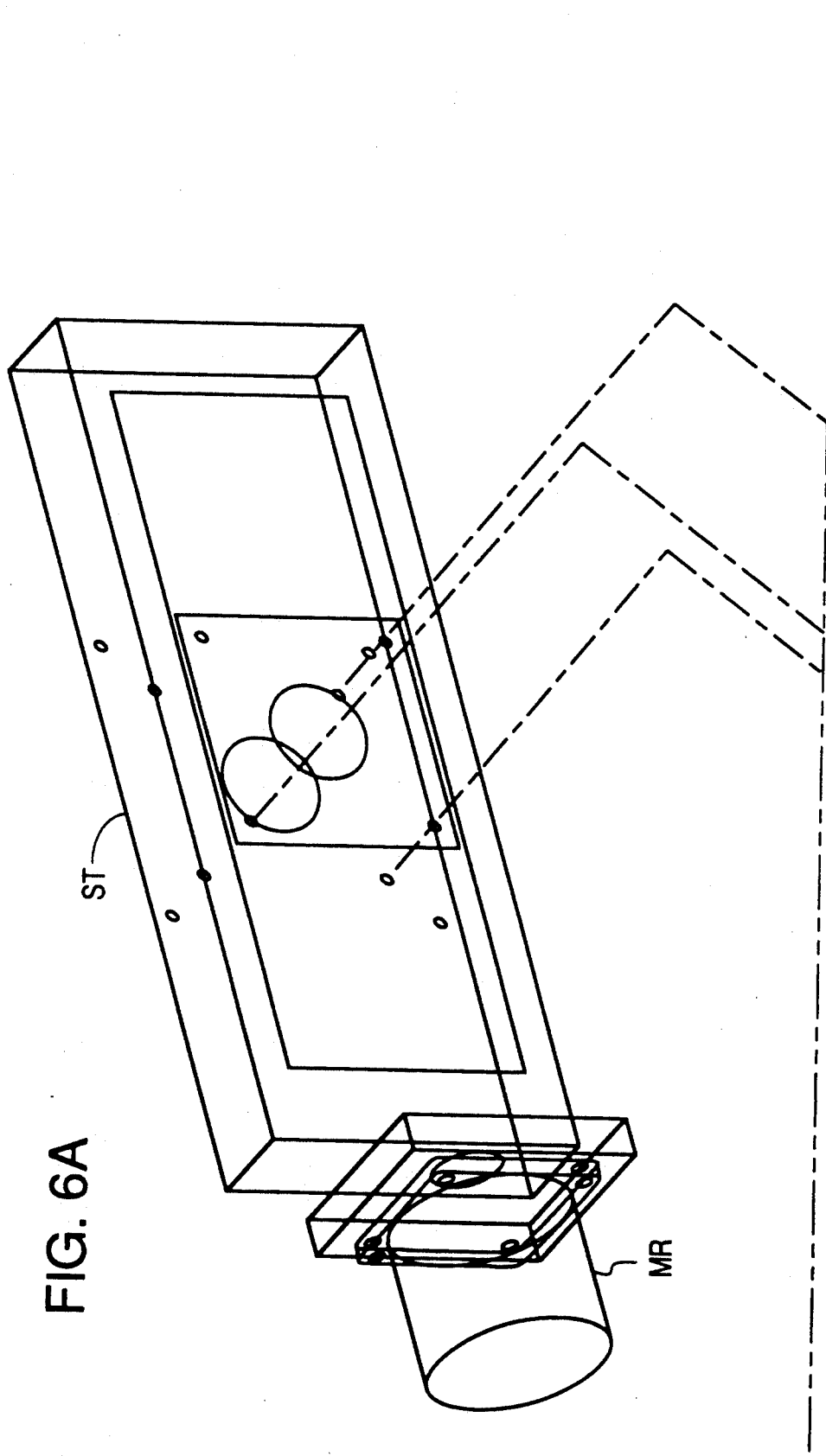

LASER APPARATUS AND METHOD FOR MEASURING STRESS IN A THIN FILM USING MULTIPLE WAVELENGTHS

FIELD OF THE INVENTION

This invention relates to the use of lasers to measure the radii of curvature of reflective structures. In particular, this invention relates to the use of lasers to measure stress in a thin film formed on top of a substrate, by measuring the change in local radius of curvature of the substrate due to the presence of the thin film.

BACKGROUND OF THE INVENTION

Thin films of various materials are often used in the fabrication of semiconductor structures. The use of a laser to measure the radius of curvature of the surface of a semiconductor structure underneath a thin film is known in the art. Such a measurement is useful because the degree to which a thin film deforms the surface of a semiconductor structure, i.e. changes the local radius of curvature of the semiconductor structure, is indicative of the stress in the thin film. Thus, the measurement of the radius of curvature of a semiconductor structure is common, for example, in inspection of incoming wafers, as a monitor of the stability of a fabrication process, and for measurement of stress in a thin film.

The "cantilever beam" model, which is well known in the art, relates stress in a thin film to the material properties of the substrate (e.g. Young's modulus), the radius of curvature of the substrate, and the dimensions (e.g. thickness) of the thin film. Many techniques for measuring stress have been developed based on the cantilever beam model. Among these techniques are x-ray diffraction and laser reflection. A description of an x-ray diffraction technique may be found in an article entitled "Automatic x-ray diffraction measurement of the lattice curvature of substrate wafers for the determination of linear strain patterns" by A. Segmuller et al, J.Appl.Phys., volume 51, no. 12, December 1980, pp. 6224–30.

There are two principal types of laser reflection apparatuses—beam-splitting and scanning—for measuring radii of curvature. In either apparatus type, the radius of curvature is derived by measuring the angles of reflection of an incident laser beam at two or more points of known separation on the surface of the substrate.

In a beam-splitting type laser reflection apparatus, the laser beam is split optically into two or more beams directed at the two or more points at which angles of reflection are measured. An example of stress measurement performed with a beam-splitting type laser reflection apparatus is given in the article entitled "In situ stress measurements during thermal oxidation of silicon," E. Kobeda and E. A. Irene, J.Vac.Sci.Techno.B 7(2), Mar/Apr., 1989, pp. 163–66.

In a scanning type laser reflection apparatus, either the laser beam or the surface under measurement is moved from point to point in order that the angle of reflection may be measured at each selected point. Each of the following articles discusses stress measurements performed using a scanning type laser reflection apparatus:

i) "Principles and Applications of Wafer Curvature Techniques for Stress Measurements in Thin Films," P.A. Flinn in "Thin Films: Stresses and Mechanical Properties", MRS Proceedings, vol. 130, ed. Bravman, Nix, Barnett, Smith, 1989, pp. 41–51.

ii) "In situ stress measurement of refractory metal silicides during sintering," J.T. Pan and I. Blech, J.Appl.Phys. 55(8), April 1984, pp. 2874–80.

iii) "Thermal stresses and cracking resistance of dielectric films (SiN, $Si_3N_4$, and $SiO_2$) on Si Substrates," A. K. Sinha et al., J.App.Phys. 49(4), April 1978, pp. 2423–26.

The references cited above are also illustrative of the method of stress measurement.

Because a monochromatic (i.e., one single wavelength) laser is used in either type of laser reflection stress measurement apparatuses, an apparatus in the prior art is unable to provide a reliable measurement under certain conditions. These conditions are illustrated in FIG. 1.

FIG. 1 shows a thin film t under measurement bounded by media 1 and 2 at the upper and lower surfaces of the thin film. Reflected beams a and b of incident laser beam I are shown to reflect respectively from the upper and lower interfaces (i.e. the interfaces between medium 1 and thin film t, and between medium 2 and thin film t). The reflected beams a and b will destructively interfere with each other, i.e., cancel each other, when the following conditions are satisfied: (i) the thin film's index of refraction $\mu_t$ is close to the quantity $\sqrt{\mu_1\mu_2}$, which is the geometrical mean of media 1 and 2's individual indices of refraction ($\mu_1$, $\mu_2$; and, (ii) the thickness of the film is such that the two beams reflected from its two interfaces with the bounding media are out of phase by one-half wavelength. Condition (ii) is satisfied when $$d=(\lambda/n)/4+m(\lambda/n)/2 \qquad (1)$$

where $\lambda$ is the wavelength of the incident beam in air,
d is the thickness of the thin film,
n is the index of refraction of the thin film, and
m is any integer greater than or equal to zero.
When both conditions (i) and (ii) are satisfied, the reflected beams at the interfaces destructively interfere or cancel each other resulting in either no intensity detectable or substantially diminished intensity detectable in the reflected beams.

For example, a thin film particularly difficult to measure in practice is silicon nitride, which has a refractive index of about 2, when bounded by air (refractive index of 1) and silicon (refractive index of about 4). In this example, since the index of refraction for silicon nitride is about 2, beams a and b at the respective air/silicon nitride and silicon nitride/silicon interfaces cancel each other in the manner described above, when the thickness of the thin film is one-quarter of the wavelength of the incident beam in silicon nitride, or at one-half wavelength increments thereof.

Thus, an apparatus and method capable of avoiding poor measurement of the angle of reflection due to destructive interference over a wide range of thicknesses using existing laser technology is desired.

SUMMARY OF THE INVENTION

In accordance with the present invention, an apparatus and a method for measuring the radius of curvature of a surface using laser beams of multiple wavelengths are provided. The present invention avoids poor measurement due to destructive interference of the beams reflected at a thin film's upper and lower surfaces. The present invention is applicable to laser reflection stress measurement apparatuses of both scanning and beam-splitting types.

The present invention is better understood after considering the following detailed description in conjunction with the accompanying drawings.

BRIEF DESCRIPTION OF THE DRAWINGS

FIGS. 6, 6a, 6b, and 6c provide a disassembled view of the embodiment shown in FIG. 5.

DETAILED DESCRIPTION

The present invention is applicable to both scanning and beam-splitting types of laser reflection stress measurement apparatuses.

Figure 1:
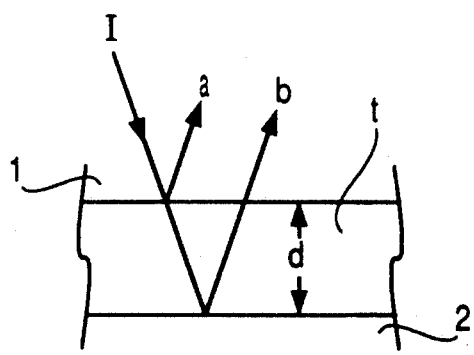
FIG. 1 shows an incident laser beam reflected at both the upper and lower surfaces of a thin film.
Figure 2:
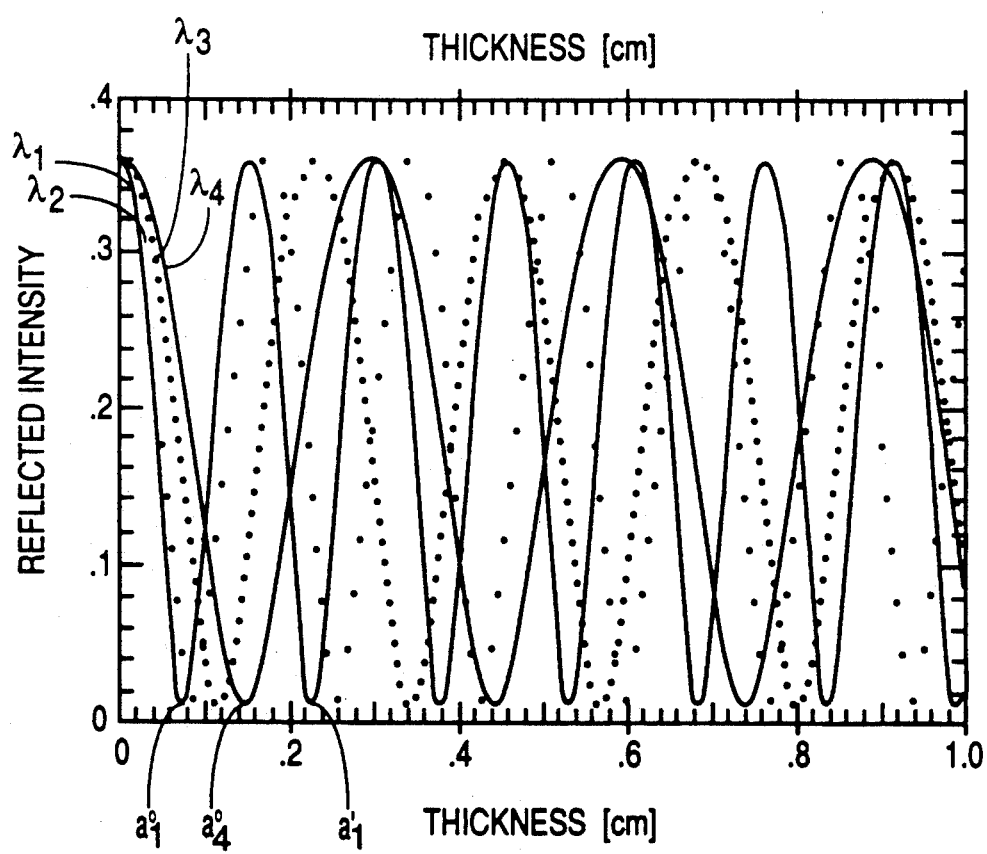
FIG. 2 shows the measured intensities of the reflected laser beams, when laser beams of wavelengths $\lambda_1, \lambda_2, \lambda_3$ and $\lambda_4$ are incident on a thin film.

According to equation (1) discussed in the "Background of the Invention" section, the thickness of the thin film at which destructive interference or cancellation occurs in the reflected beams is dependent upon both the wavelength of the incident laser beam and the refractive indices of the thin film and the bounding media. This effect is illustrated in FIG. 2. In FIG. 2, which assumes a silicon nitride index of refraction to be 2.2, the first and second minimum reflected intensities for the laser beam $\lambda_1$ (wavelength in silicon nitride=0.305 microns) are seen at film thicknesses of 0.076 microns ($a_1^0$) and 0.228 microns ($a_1^1$). Likewise, the first and second minimum intensities for the laser beam $\lambda_4$ (wavelength in silicon nitride=0.59 microns) are seen at film thicknesses 0.148 microns ($a_4^0$) and 0.443 microns ($a_4^1$). However, when minimum intensity is measured for laser beam $\lambda_1$ at a thin film thickness of 0.076 microns, the reflected intensity of laser beam $\lambda_4$ is measured to be 0.21 of the incident beam, which is sufficient intensity for the purpose of measuring the angle of reflection. Therefore, if the incident laser beam comprises more than one wavelength, the intensity of the reflected beam is likely to be adequate for the purpose of measuring the angle of reflection, unless the thickness of the thin film is a minimum intensity point for each of the component wavelengths. Minimum intensity points of different wavelengths may coincide because, as can be seen from equation (1) above, the thicknesses at which destructive interference occur are periodic. When the minimum intensity points of the different wavelengths coincide, the problem of no reflected intensity or substantially diminished reflected intensity results. However, by choosing a combination of wavelengths, sufficient intensity for measuring an angle of reflection is assured over a broad range of thicknesses.

Figure 3A:
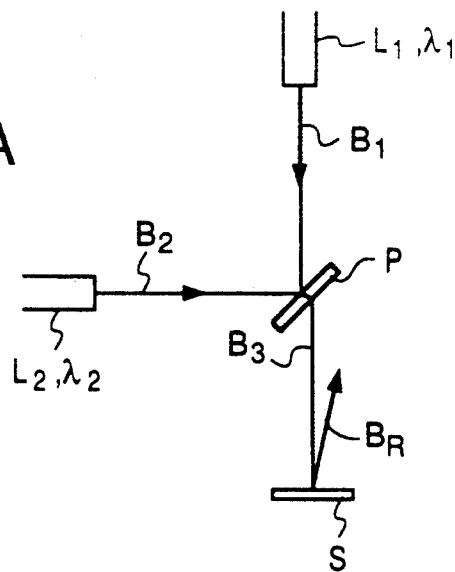
FIGS. 3a and 3b show a first embodiment of the present invention.
Figure 3B:
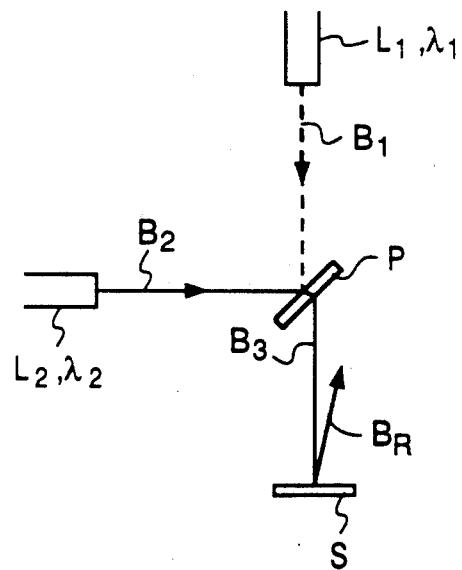

FIG. 3 shows a first embodiment of the present invention. As shown in FIG. 3, two monochromatic lasers $L_1$ and $L_2$, having wavelengths $\lambda_1$ and $\lambda_2$ respectively, are positioned orthogonally such that their individual beams $B_1$ and $B_2$ are combined by optical element P (e.g. a beam-splitter prism) to form laser beam $B_3$, which is incident on sample S. The reflected beam $B_R$ is detected by a photodetector (not shown) to determine the angle of reflection at laser beam $B_3$'s point of incidence. If either the sample S or the apparatus (i.e. optical element P and lasers $L_1$ and $L_2$) is capable of being repositioned for measurement over multiple points on the surface of sample S, this first embodiment constitutes a scanning type laser reflection stress measurement apparatus. Alternatively, if the combined laser beam $B_3$ is split into multiple beams by a beam-splitter element P (not shown but of well known design) to be incident on multiple points on the surface of sample S, so as to allow the measurement of multiple angles of reflection at the same time, this first embodiment constitutes a beam-splitting type laser reflection stress measurement apparatus.

Figure 4:
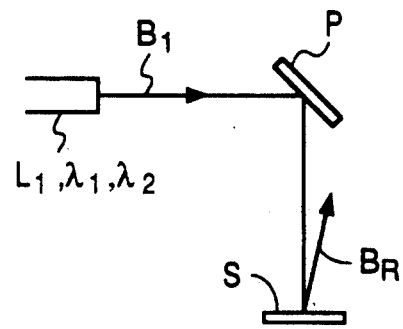
FIG. 4 shows a second embodiment of the present invention.

FIG. 4 shows a second embodiment of the present invention. As shown in FIG. 4, a laser $L_1$ is used to provide a laser beam $B_1$ having component radiations of at least wavelengths $\lambda_1$ and $\lambda_2$. In general laser $L_1$ is capable of providing a beam comprising component radiations of two or more wavelengths. An optical element P (e.g. a prism) is used to direct laser beam $B_1$ onto the surface of sample S, which reflects the incident laser beam $B_1$ as reflected beam $B_R$. Laser beam $B_R$ is detected by a photodetector (not shown) to determine the angle of reflection at laser beam $B_1$'s point of incidence. If either the sample S or the apparatus (i.e. optical element P and laser $L_1$) is capable of being repositioned for measurement over multiple points on the surface of sample S, this second embodiment constitutes a scanning type laser reflection stress measurement apparatus. Alternatively, if the combined laserbeam $B_R$ is split into multiple beams by a beam-splitter element (not shown) to be incident on multiple points on the surface of sample S, so as to allow the measurement of multiple angles of reflection at the same time, this second embodiment constitutes a beam-splitting type laser reflection stress measurement apparatus. Because the laser source in this second embodiment provides a multiple wavelength beam in the first instance, the second embodiment is more suitable as a beam-splitting laser reflection stress measurement apparatus. At the time of filing this application, however, even though a gas laser source (e.g. a helium-neon laser) providing a beam of multiple wavelengths is available, a solid state laser providing such beam is not commercially available. Therefore, an embodiment such as the first embodiment is more preferable because of size and cost considerations but the invention can be implemented with any source of multiple wavelengths whether available at the time of filing this application or in the future.

Figure 5:
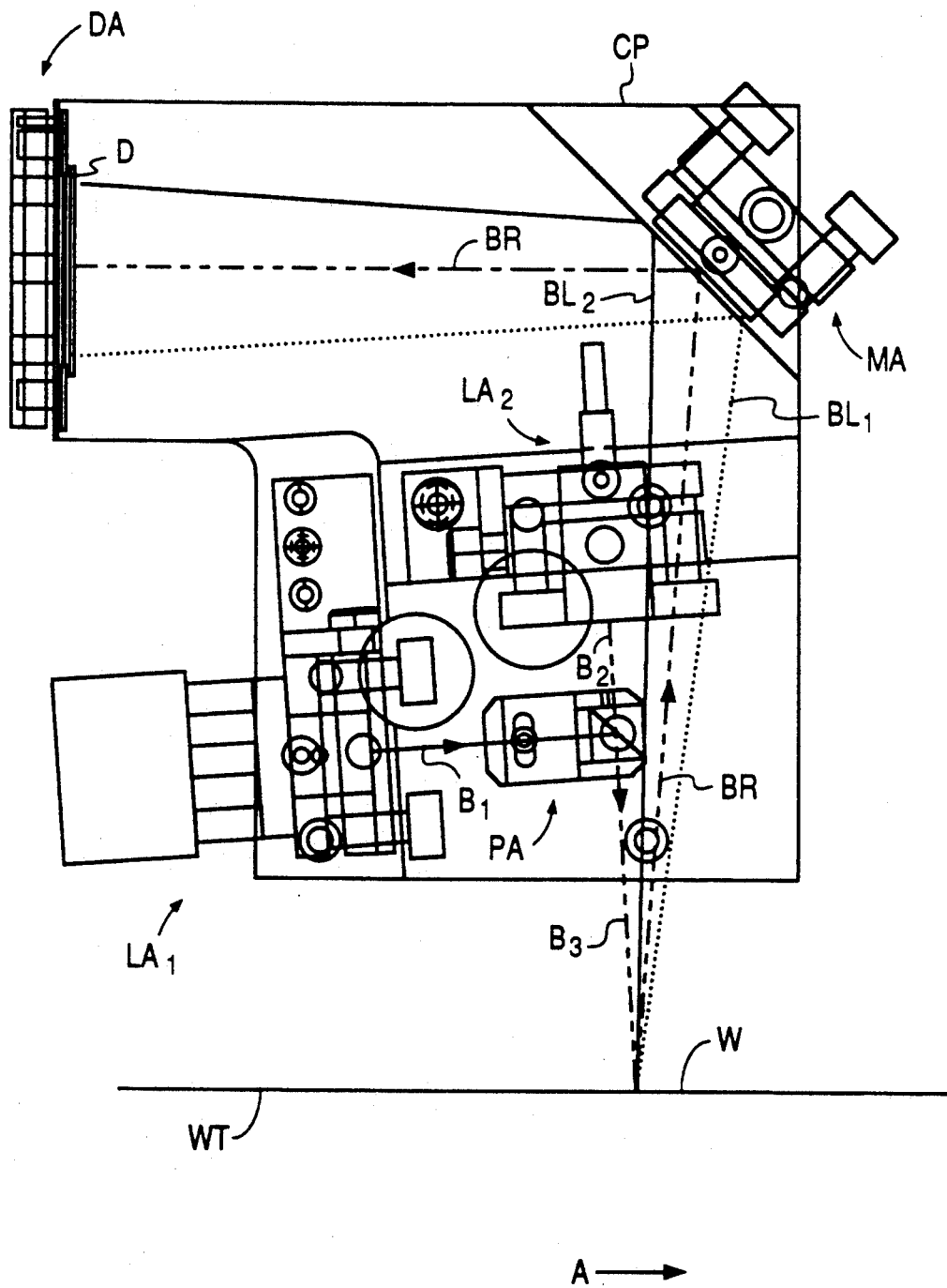
FIG. 5 shows an embodiment of the present invention in a scanning laser reflection stress measurement apparatus.

FIG. 5 shows an embodiment of the present invention in a scanning laser reflection stress measurement apparatus. As shown in FIG. 5, this embodiment comprises photodetector assembly DA, laser assemblies $LA_1$ and $LA_2$, cube beam-splitter assembly PA, and mirror assembly MA mounted on a carriage plate CP. Carriage plate CP is mounted directly above a wafer table WT, on which the sample wafer (the surface W of which is shown) is located. Carriage plate CP is movable back and forth along the direction A indicated, driven by a stepping motor (not shown) which allows the carriage plate CP to move 10 microns per step relative to the sample wafer. Inside laser assemblies $LA_1$ and $LA_2$ are, respectively, lasers $L_1$ and $L_2$ not shown). In this embodiment, the wavelengths of the lasers are 670 nm and 750 nm. As mentioned before, depending upon the range of thicknesses of the thin film, other wavelengths may also be used. The shorter wavelength laser in this embodiment is obtainable from Power Technology Inc., Arkansas and the longer wavelength laser is obtainable from D.O. Industries, New York. A position-sensitive photodetector D, obtainable from Silicon Detector Inc., California, is contained in the photodetector assembly DA. (Other position-sensitive photodetectors may also be used as desired). In this embodiment, photodetector D provides two output voltages (positional signals) V1 and V2. The position at which a light beam is detected by photodetector D is given by the value $VA=(V2-V1)/(V2+V1)$. The correspondence between this voltage Va and actual angle of reflection is established by a calibration step when the apparatus is set up.

As shown in FIG. 5, laser beams $B_1$ and $B_2$ from lasers $L_1$ and $L_2$ respectively are combined at beam-splitting cube P, and the combined beam $B_3$ strikes the wafer surface W at the point where the angle of reflection is to be measured. The angle at which the beam $B_3$ strikes the wafer surface is designed to be as normal to the wafer surface as possible. In this embodiment, this angle is calibrated to ensure the reflected beam $B_R$ misses laser assembly $LA_1$, in order that reflected beam $B_R$ may pass by and beyond the laser assembly $LA_1$ to strike mirror $M_1$, which directs the laser beam $B_R$ at the position-sensitive photodetector D. The light rays $BL_1$ and $BL_2$ shown in FIG. 5 illustrate the positional limits between which a reflected beam can be detected by photodetector D.

Figure 6B:
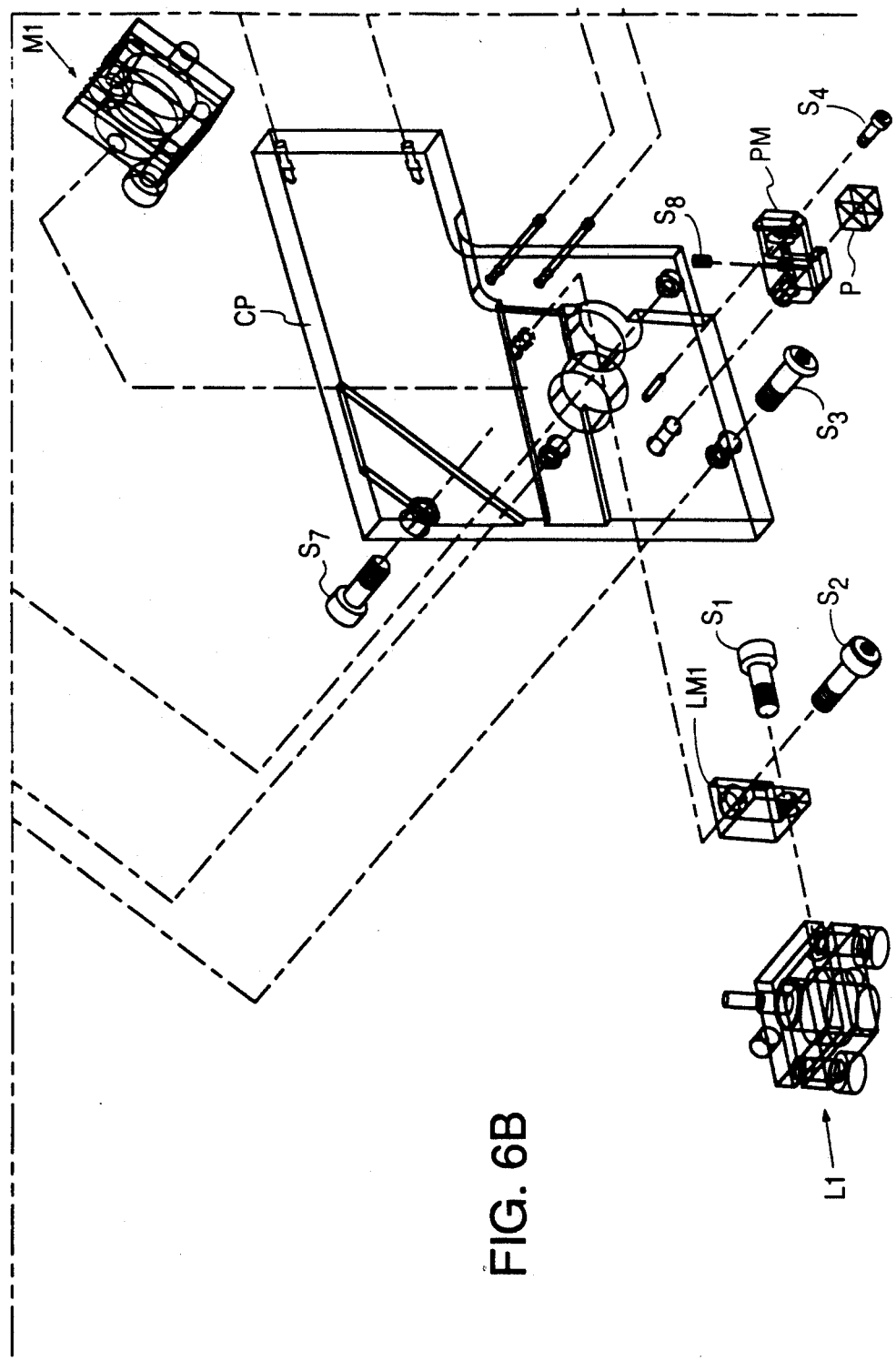
Figure 6C:
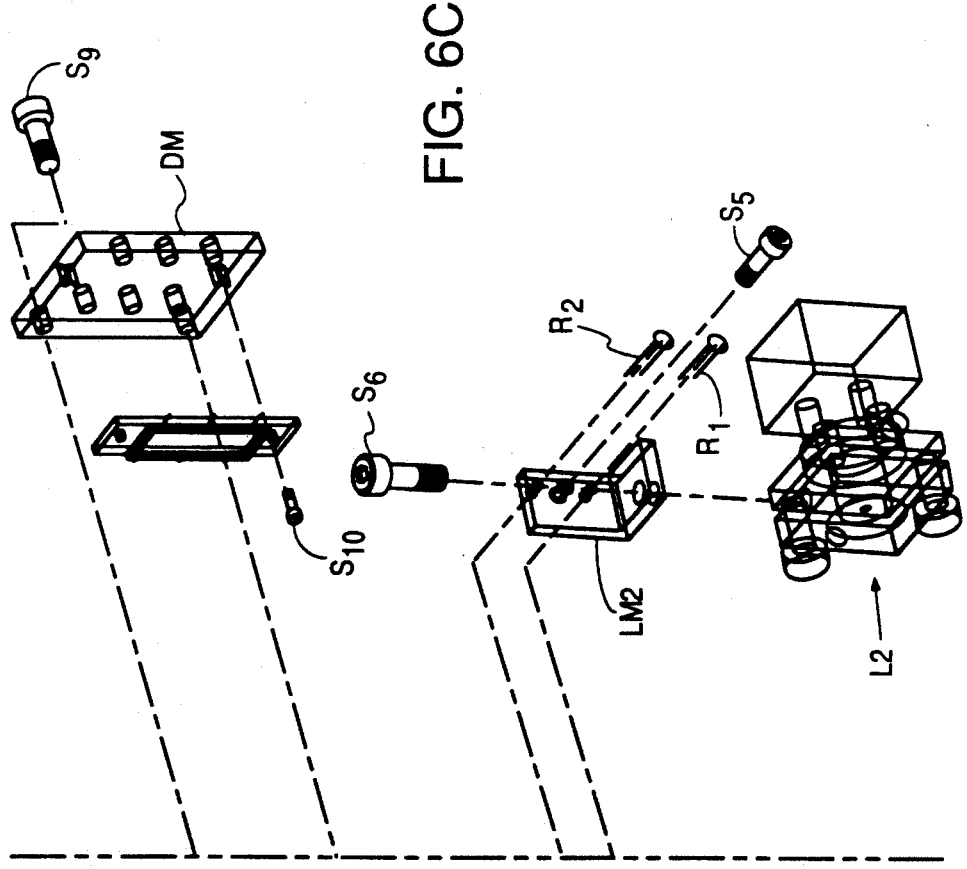

FIG. 6 shows the disassembled view of the embodiment shown in FIG. 5. As shown in FIG. 6, the lasers $L_1$ and $L_2$ are mounted respectively on laser mounts $LM_1$ and $LM_2$ by screws $S_1$ and $S_6$ to form laser assemblies $LA_1$ and $LA_2$. Laser mount $LM_1$ is attached to carriage plate CP by screw $S_2$. Laser mount $LM_2$ is attached to carriage plate CP by screw $S_5$, and the spring and retainer rings $R_1$ and $R_2$. The beam-splitter P is mounted by set screw $S_8$ on beam-splitter mount PM, which is in turn mounted on carriage plate CP by two screws (only screw $S_4$ is shown). The beam-splitter mount PM, and laser mounts $LM_1$ and $LM_2$ are positioned such that laser $L_1$'s beam, which travels downward, and laser $L_2$'s beam, which travels substantially horizontally, are combined at beam-splitter P with the combined beam emerging downward from beam-splitter P. The detector D is mounted on the detector mount DM by two screws (only screw $S_{10}$ is shown). The detector mount DM is in turn mounted as shown on carriage plate CP by screw $S_9$. Mirror assembly MA is mounted by screw $S_7$ directly above the beam-splitter P and oriented such that the reflected beam from the sample is reflected again at mirror M1 approximately 90 degrees to strike the photodetector D. Carriage plate CP is secured onto stage ST by three screws (only screw S3 is shown). Stage ST is driven by a step motor MR, which provides mobility to the stage ST over the range of the scan.

Figure 7:
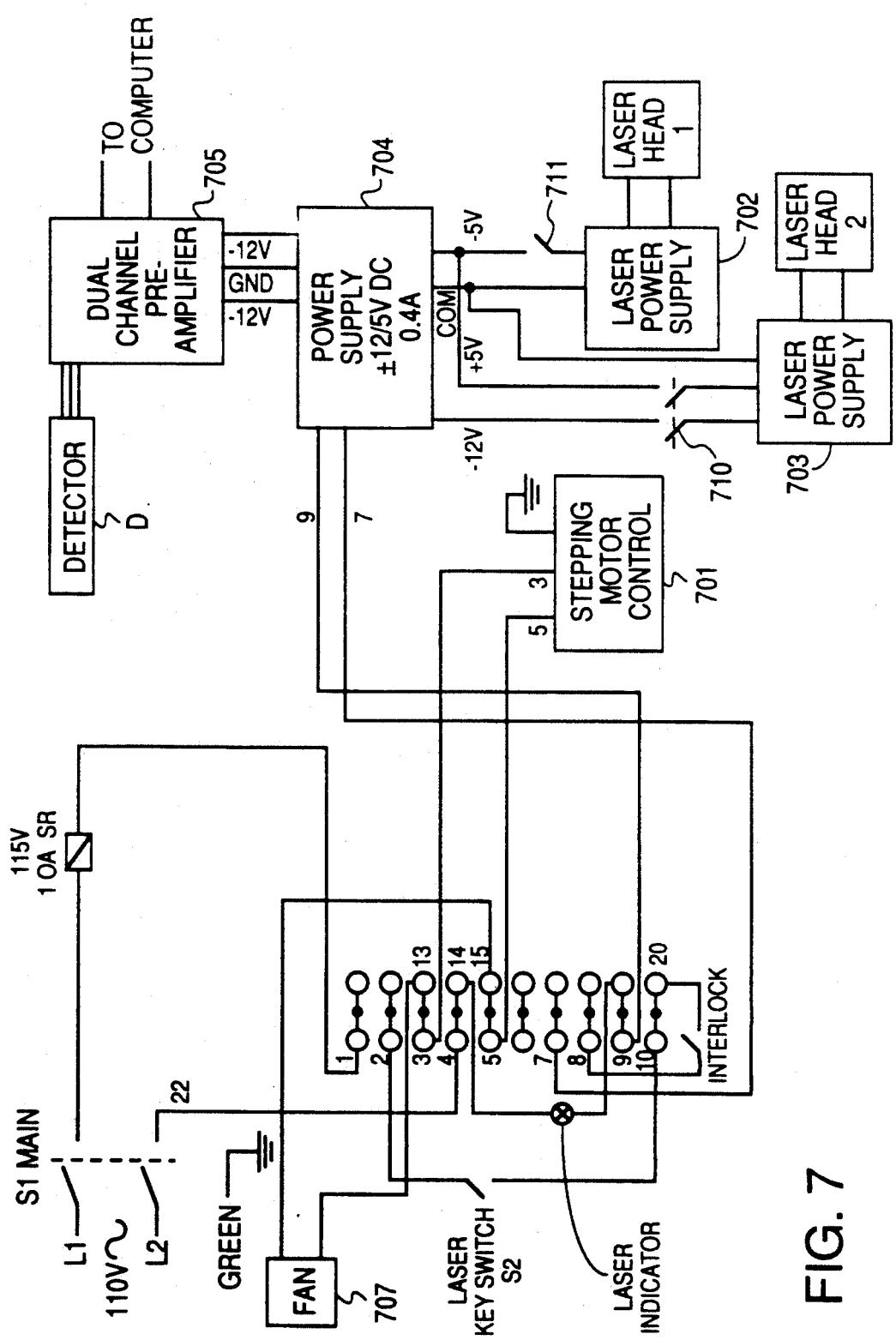
FIG. 7 shows an electrical wiring diagram for the embodiment of the present invention shown in FIG. 5.

FIG. 7 shows a electrical wiring diagram of the embodiment shown in FIG. 5. As shown in FIG. 7, external 110V AC power is transformed by power supply module 704 into internal supply voltages++12V, −12V and 5V. These supply voltages are provided to laser power supplies 702 and 703 of lasers $L_1$ and $L_2$ respectively, and to the dual channel pre-amplifier 705, which amplifies the positional signals V1 and V2 of the position-sensitive photodetector D (See description of output voltages V1 and V2 in the discussion above). The positional signals V1 and V2 are provided to an external computer (not shown) for processing. The lasers $L_1$ and $L_2$ are cooled by a fan 707, which is provided 110V AC power The stepping motor MR (FIG. 6) and its control 701 are also provided 110V AC power. An interlock switch, which turns off the power supply module 704 when the housing containing the apparatus is open, is provided as a safety feature.

The above detailed description is intended to illustrate the specific embodiments of the present invention and is not limiting. A skilled person in the art will be able to provide modifications and variations within the scope of the present invention, as set forth in the following claims, upon consideration of the above detailed description in conjunction with the accompanying drawings.

We claim:

1. An apparatus for measuring a local radius of curvature of a surface, comprising:
   means for producing a laser beam of multiple wavelengths;
   means for directing said laser beam on said surface so as to provide a reflected beam of said laser beam; and
   means for detecting the angle of said reflected beam so as to provide a measurement of said local radius of curvature.

2. An apparatus as in claim 1, wherein said means for producing a laser beam of multiple wavelengths comprises:
   a first laser producing a first laser beam of a first wavelength;
   a second laser producing a second laser beam of a second wavelength; and
   means for combining said first and second laser beams to provide said laser beam of multiple wavelength.

3. An apparatus as in claim 1 wherein said means for producing a laser beam of multiple wavelengths comprises a single laser producing a laser beam with radiations of at least two wavelengths.

4. An apparatus as in claim 1, wherein said surface is the surface of a semiconductor wafer on which is formed a thin film.

5. A method for measuring a local radius of curvature of a surface, comprising the steps of:
   providing means for producing a laser beam of multiple wavelengths;
   providing means for directing said laser beam on said surface so as to provide a reflected beam of said laser beam; and
   providing means for detecting the angle of said reflected beam so as to provide a measurement of said local radius of curvature.

6. A method as in claim 5, wherein said step of providing means for producing a laser beam of multiple wavelengths comprises the steps of:
   providing a first laser producing a first laser beam of a first wavelength;
   providing a second laser producing a second laser beam of a second wavelength; and
   providing means for combining said first and second laser beam to provide sad laser beam of multiple wavelengths.

7. A method as in claim 5, wherein said step of providing means for producing a laser beam of multiple wavelengths comprises the step of providing a single laser producing a laser beam with radiations of at least two wavelengths.

8. A method as in claim 5, wherein said surface is the surface of a semiconductor wafer on which is formed a thin film.

* * * * *

UNITED STATES PATENT AND TRADEMARK OFFICE
CERTIFICATE OF CORRECTION

PATENT NO. : 5,134,303
DATED : July 28, 1992
INVENTOR(S) : Blech et al

It is certified that error appears in the above-indentified patent and that said Letters Patent is hereby corrected as shown below:

Column 5, line 61 delete "+" first occurrence.

Signed and Sealed this

Twenty-sixth Day of October, 1993

Attest:

BRUCE LEHMAN

*Attesting Officer*     *Commissioner of Patents and Trademarks*